US011582143B2

(12) United States Patent
Amend et al.

(10) Patent No.: US 11,582,143 B2
(45) Date of Patent: Feb. 14, 2023

(54) TECHNIQUES FOR POLICY MANAGEMENT OF MULTI-CONNECTIVITY NETWORK PROTOCOLS (71) Applicant: Deutsche Telekom AG, Bonn (DE)

(72) Inventors: Markus Amend, Nidda (DE); Eckard Bogenfeld, Carlsberg (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/975,412

(22) PCT Filed: Feb. 21, 2019

(86) PCT No.: PCT/EP2019/054264
§ 371 (c)(1),
(2) Date: Aug. 25, 2020

(87) PCT Pub. No.: WO2019/166309
PCT Pub. Date: Sep. 6, 2019

(65) Prior Publication Data
US 2021/0006491 A1    Jan. 7, 2021

(30) Foreign Application Priority Data
Feb. 28, 2018   (EP) ..................................... 18159123

(51) Int. Cl.
H04L 45/24    (2022.01)
H04L 69/14    (2022.01)

(52) U.S. Cl.
CPC .............. H04L 45/24 (2013.01); H04L 69/14 (2013.01)

(58) Field of Classification Search
CPC ....... H04L 45/24; H04L 45/306; H04L 45/70; H04L 45/308; H04L 69/14; H04L 69/16;
(Continued)

(56) References Cited

U.S. PATENT DOCUMENTS

2006/0193295 A1*  8/2006  White ................. H04L 12/5692
                                                370/336
2009/0003313 A1*  1/2009  Busch ................. H04L 12/4633
                                                370/352

(Continued)

Primary Examiner — Un C Cho
Assistant Examiner — Rasha K Fayed
(74) Attorney, Agent, or Firm — Leydig, Voit & Mayer, Ltd.

(57) ABSTRACT

A multipath device for processing multipath data traffic includes: a multipath network access interface comprising at least one access interface for receiving multipath data traffic; and a host processor configured to operate at least one multi-connectivity network protocol and a multipath protocol policy manager (MPPM). The at least one multi-connectivity network protocol is configured to process data traffic of the multipath data traffic that is related to the at least one multi-connectivity network protocol and received via multiple paths of the multipath network access interface. The MPPM is configured to manage the multiple paths of the multipath network access interface and/or the at least one access interface of the multipath network access interface according to a multipath network protocol policy. The multipath network protocol policy depends on feedback from other multi-connectivity network protocols running on the host processor.

18 Claims, 5 Drawing Sheets (58) Field of Classification Search
CPC ..... H04L 69/08; H04L 69/326; H04L 47/193; H04L 47/14; H04L 47/781; H04L 47/808; H04L 47/824; H04L 12/5692; H04L 12/707; H04L 29/06; H04W 40/02; H04W 88/06; H04W 88/02; H04W 76/16; H04W 76/022; H04W 76/12; H04W 76/15; H04W 76/10; H04W 28/08; H04W 28/0231; H04W 28/00; H04W 28/24; H04W 28/10; H04W 92/02; H04W 24/00; H04W 72/04; H04W 48/18; H04W 84/12; H04W 80/00

See application file for complete search history.

(56) References Cited

U.S. PATENT DOCUMENTS

| | | | | |
|---|---|---|---|---|
| 2012/0258674 | A1* | 10/2012 | Livet | H04L 65/1016 455/73 |
| 2013/0077501 | A1* | 3/2013 | Krishnaswamy | H04L 45/70 370/252 |
| 2013/0195004 | A1* | 8/2013 | Hampel | H04L 69/08 370/315 |
| 2013/0336334 | A1* | 12/2013 | Gilbert | G06F 13/4265 370/458 |
| 2014/0036702 | A1* | 2/2014 | Van Wyk | H04L 43/0823 370/252 |
| 2015/0245409 | A1* | 8/2015 | Medapalli | H04W 76/15 370/329 |
| 2016/0127539 | A1* | 5/2016 | Sharma | H04M 15/08 379/112.09 |
| 2016/0262080 | A1* | 9/2016 | Rinne | H04W 40/02 |
| 2017/0078206 | A1* | 3/2017 | Huang | H04L 47/193 |
| 2017/0126643 | A1* | 5/2017 | Wood | H04W 12/041 |
| 2017/0156086 | A1* | 6/2017 | Tomici | H04W 76/16 |
| 2018/0026896 | A1* | 1/2018 | Szilagyi | H04L 47/25 370/235 |
| 2018/0041421 | A1* | 2/2018 | Lapidous | H04L 69/14 |
| 2018/0063853 | A1* | 3/2018 | Szabo | H04L 67/60 |
| 2018/0183724 | A1* | 6/2018 | Callard | H04L 41/08 |
| 2018/0262419 | A1* | 9/2018 | Ludin | H04L 61/6077 |
| 2019/0068503 | A1* | 2/2019 | Wei | H04L 47/24 |
| 2019/0116535 | A1* | 4/2019 | Szilagyi | H04W 28/24 |
| 2019/0268375 | A1* | 8/2019 | Gundavelli | H04L 63/083 |
| 2019/0268797 | A1* | 8/2019 | Pang | H04L 47/125 |
| 2019/0317846 | A1* | 10/2019 | Li | G06F 8/60 |
| 2019/0364492 | A1* | 11/2019 | Azizi | H04W 48/16 |
| 2019/0394624 | A1* | 12/2019 | Karampatsis | H04W 48/18 |
| 2020/0163004 | A1* | 5/2020 | Demianchik | H04W 28/0252 |
| 2020/0359264 | A1* | 11/2020 | Racz | H04W 28/0967 |

* cited by examiner

TECHNIQUES FOR POLICY MANAGEMENT OF MULTI-CONNECTIVITY NETWORK PROTOCOLS

CROSS-REFERENCE TO PRIOR APPLICATIONS

This application is a U.S. National Phase Application under 35 U.S.C. § 371 of International Application No. PCT/EP2019/054264, filed on Feb. 21, 2019, and claims benefit to European Patent Application No. EP 18159123.1, filed on Feb. 28, 2018. The International Application was published in English on Sep. 6, 2019 as WO 2019/166309 A1 under PCT Article 21(2).

TECHNICAL FIELD

The disclosure relates to techniques for policy management of multi-connectivity network protocols. The disclosure further relates to a multipath device and a method for processing multipath data traffic. In particular, the disclosure relates to an overarching policy manager for multi-connectivity network protocols.

BACKGROUND

Figure 1:
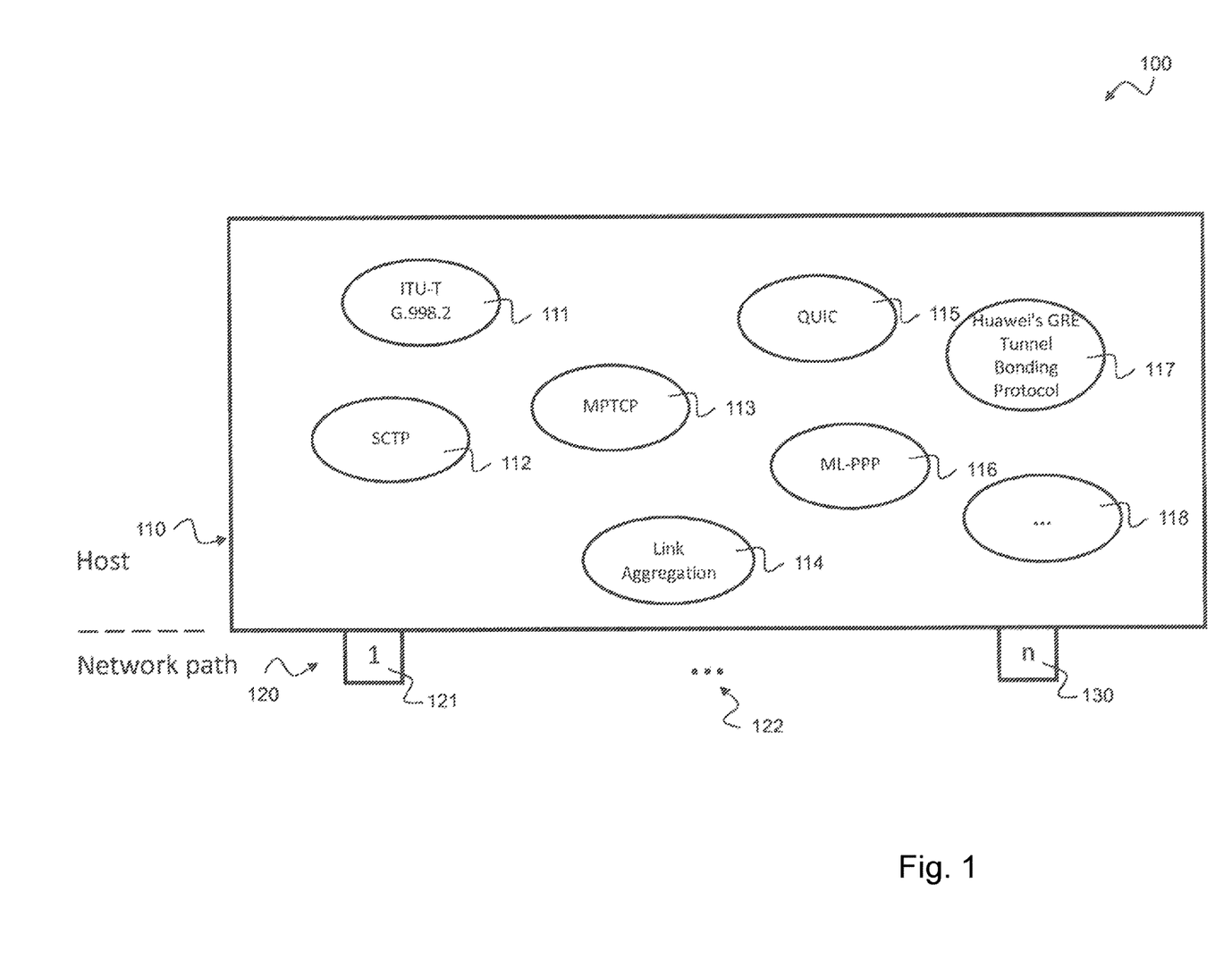
FIG. 1 shows a multi-homed capable endpoint with several exemplary multi path enabled protocols.

With increasing number of devices equipped with multiple network access interfaces, the development of new multi connectivity network protocols becomes more and more important. Mainly it is driven by the wish for better resource utilization from an economic perspective by increasing customer/user Quality of Experience (QoE) or both. Several use cases (e.g. load balancing, seamless handover in case of path interruption, capacity aggregation, etc.) are covered, which can be combined in any way. Especially current developments or extensions like Stream Control Transmission Protocol (SCTP) or Concurrent Multipath Transfer SCTP (CMT-SCTP), Multipath Transmission Control Protocol (MPTCP) and Quick User Datagram Protocol (UDP) Internet Connections (QUIC), which all comprise multi-connectivity features, lead to the assumption that they will find the way to the mass market. Future communication termination points will therefore be equipped with several multi-connectivity network protocols as illustrated in FIG. 1.

SUMMARY

In an exemplary embodiment, the present invention provides a multipath device for processing multipath data traffic. The multipath device includes: a multipath network access interface comprising at least one access interface for receiving multipath data traffic; and a host processor configured to operate at least one multi-connectivity network protocol and a multipath protocol policy manager (MPPM). The at least one multi-connectivity network protocol is configured to process data traffic of the multipath data traffic that is related to the at least one multi-connectivity network protocol and received via multiple paths of the multipath network access interface. The MPPM is configured to manage the multiple paths of the multipath network access interface and/or the at least one access interface of the multipath network access interface according to a multipath network protocol policy. The multipath network protocol policy depends on feedback from other multi-connectivity network protocols running on the host processor.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Exemplary embodiments of the present invention efficiently apply policies like path usage, bandwidth, etc. to multi-connectivity network protocols, in particular with respect to overall targets but also with the aid of protocol feedback.

Exemplary embodiments of this disclosure introduce a Multipath Protocol Policy Manager (MPPM), that is a unit which can either directly communicate (uni-directional or bi-directional) with the network protocols or with the corresponding network paths available or both. Such MPPM unit will apply efficient policies to the multi-connectivity network protocols running on a host of a multipath device.

The methods and systems presented below may be of various types. The individual elements described may be realized by hardware or software components, for example electronic components that can be manufactured by various technologies and include, for example, semiconductor chips, application-specific integrated circuits (ASICs), microprocessors, digital signal processors, integrated electrical circuits, electro-optical circuits and/or passive components.

The devices, systems and methods presented below are capable of transmitting information over a communication network. The term communication network refers to the technical infrastructure on which the transmission of signals takes place. The communication network comprises the switching network in which the transmission and switching of the signals takes place between the stationary devices and platforms of the mobile radio network or fixed network, and the access network in which the transmission of the signals takes place between a network access device and the communication terminal. The communication network can comprise both components of a mobile radio network as well as components of a fixed network. In the mobile network, the access network is also referred to as an air interface and includes, for example, a base station (NodeB, eNodeB, radio cell) with mobile antenna to establish the communication to a communication terminal as described above, for example, a mobile phone or a mobile device with mobile adapter or a machine terminal. In the fixed network, the access network includes, for example, a DSLAM (digital subscriber line access multiplexer) to connect the communication terminals of multiple participants based on wires. Via the switching network the communication can be transferred to other networks, for example other network operators, e.g. foreign networks.

In the following, network protocols, also denoted as communication protocols, are described. A network protocol is a system of rules that allow two or more entities of a communications system to transmit information via a communication channel or transmission medium. The network protocol defines the rules "Syntax", "Semantic" and "Synchronization" of communication and possible error detection and correction. Network protocols may be implemented by computer hardware, software, or a combination of both. Communicating systems use well-defined formats for exchanging various messages. Each message has an exact meaning intended to elicit a response from a range of possible responses pre-determined for that particular situation. The specified behavior is typically independent of how it is to be implemented. Communication protocols have to be agreed upon by the parties involved. To reach agreement, a network protocol may be developed into a technical standard. Multiple protocols often describe different aspects of a single communication. A group of (network) protocols designed to work together are known as a (network) protocol suite; when implemented in software they are a (network) protocol stack. Internet communication protocols are published by the Internet Engineering Task Force (IETF). The Institute of Electrical and Electronics Engineers (IEEE) handles wired and wireless networking, and the International Organization for Standardization (ISO) handles other types. Network protocols can run as software on a processor or may be implemented as hardware circuits.

In communications and computing systems, the Open Systems Interconnection model (OSI model) defines a conceptual model that characterizes and standardizes the communication functions without regard to its underlying internal structure and technology. Its goal is the interoperability of diverse communication systems with standard protocols. The model partitions a communication system into abstraction layers. The original version of the model defined seven layers: Physical layer (Layer 1), Data Link layer (Layer 2), Network layer (Layer 3), Transport layer (Layer 4), Session layer (Layer 5), Presentation layer (Layer 6) and Application layer (Layer 7).

According to a first aspect the invention relates to a multipath device for processing multipath data traffic, the multipath device comprising: a multipath network access interface for receiving multipath data traffic; and a host processor configured to operate at least one multi-connectivity network protocol and a multipath protocol policy manager (MPPM), wherein the at least one multi-connectivity network protocol is configured to process data traffic of the multipath data traffic that is related to the at least one multi-connectivity network protocol and received via multiple paths of the multipath network access interface, and wherein the MPPM is configured to manage the multiple paths of the multipath network access interface according to a multipath network protocol policy.

By such MPPM unit, the multipath device can efficiently apply policies like path usage, bandwidth etc. to multi-connectivity network protocols, in particular with respect to overall targets but also with the aid of protocol feedback. The MPPM can either directly communicate (uni-directional or bi-directional) with the network protocols or with the corresponding network paths available or both. The MPPM unit will apply efficient policies to the multi-connectivity network protocols running on the host processor. The MPPM unit can efficiently schedule resources, e.g. concurrent usage of network-protocol-specific resources, bandwidth, capacity, etc.

The network protocols may run as software on the host processor or may be implemented as hardware circuits forming part of the host processor.

In an exemplary implementation form of the multipath device, the MPPM is configured to manage path usage, bandwidth, load balancing, handover in case of path interruption and/or capacity aggregation for the multiple paths of the multipath network access interface.

Since the MPPM is a central unit, path usage, bandwidth, load balancing, handover and capacity aggregation can be centrally managed. Hence more information is available to provide an improved policy management.

In an exemplary implementation form of the multipath device, the MPPM is configured to apply capacity throttling to specific paths of the multiple paths of the multipath network access interface or to access interfaces of the multipath network access interface according to the multipath network protocol policy.

This provides the advantage that specific paths or specific access interfaces that suffer from bad quality of service (QoS), e.g. line interruptions or failures in data transmission, can be throttled in capacity such that data traffic is offloaded to other paths not suffering from bad QoS. This results in improved Quality of Experience (QoE).

In an exemplary implementation form of the multipath device, the MPPM is configured to restrict reception of the data traffic to specific types of network paths according to the multipath network protocol policy.

This provides the advantage that network protocols can be protected against message flooding since the MPPM can forward only specific data traffic to the network protocol which can be processed by the network protocol.

In an exemplary implementation form of the multipath device, the multipath network protocol policy depends on feedback from other multi-connectivity network protocols and/or feedback from other non-multi connectivity network protocols running on the host processor and/or on feedback delivered by external.

Such a multipath device allows efficient utilization of the network protocols, since information from other network protocols and from external sources can be exploited to implement an optimal multipath network protocol policy.

In an exemplary implementation form of the multipath device, the MPPM is configured to inform the at least one multi-connectivity network protocol to select and/or avoid using specific network paths of the multipath network access interface and/or using specific access interfaces of the multipath network access interface according to the multipath network protocol policy.

This provides the advantage that the network protocol can adjust its path management and scheduling based on the information of the MPPM to select and/or avoid using specific network paths and/or specific access interfaces, thereby improving performance.

In an exemplary implementation form of the multipath device, the MPPM is configured to inform the multipath network access interface to drop data related to a specific network path according to the multipath network protocol policy.

This provides the advantage that the multipath network access interface can be adjusted based on the information from the MPPM to drop data related to a specific network path, thereby improving performance.

In an exemplary implementation form of the multipath device, the MPPM comprises an external interface configured to receive the multipath network protocol policy or information for policy creation of the multipath network protocol policy from an external device.

This provides the advantage that the multipath network protocol policy can be adjusted to specific requirements, e.g. changing multipath data traffic, changed network paths, etc. This way, the multipath device can be flexibly adapted to changing environments.

In an exemplary implementation form of the multipath device, the at least one multi-connectivity network protocol is configured to register and/or deregister at the MPPM for receiving the multipath network protocol policy related to the at least one multi-connectivity network protocol. Note that this describes an exemplary implementation form of the multipath device that is not mandatory as well as the other implementation forms of the multipath device described in this disclosure.

This provides the advantage that the multipath network protocol policy can be flexibly implemented. When a new network protocol is realized or started on the host processor, it can be easily registered at the MPPM unit which can provide the respective policies. When a network protocol is terminated, it can deregister from the MPPM unit which informs all other network protocols that are in connection with the terminating network protocol. Then, the other network protocols can accordingly adjust their behavior.

In an exemplary implementation form of the multipath device, the at least one multi-connectivity network protocol is configured to provide its capabilities and interests to the MPPM when registering at the MPPM.

This provides the advantage that the MPPM can adjust the network policy for a specific network protocol based on its capabilities and interests. Hence, the MPPM can provide a customized policy to the different network protocols, thereby improving quality and performance of multipath processing.

In an exemplary implementation form of the multipath device, the MPPM is configured to hook into the at least one multi-connectivity network protocol to take over path management and/or data scheduling, in particular in cases in which the at least one multi-connectivity network protocol is not able to register and/or deregister at the MPPM.

This provides the advantage that the MPPM can directly control path management and/or traffic scheduling of a network protocol, e.g. in cases in which the network protocol is not able to register or deregister an interface with the MPPM unit. The MPPM unit may at least partly take over control of the network protocol.

In an exemplary implementation form of the multipath device, the host processor is configured to operate a plurality of network protocols which are multi-connectivity network protocols or non-multi connectivity network protocols; and the host processor is configured to operate a Multipath Central Information Exchange (MCIE) unit which is configured to exchange information between at least two network protocols of the plurality of network protocols.

Such an MCIE unit provides efficient utilization of the network protocols, since the network protocol-specific resources of the multipath device can be shared between the network protocols and hence resources can be efficiently used. The network protocols may be multi-connectivity network protocols and/or non-multi connectivity network protocols. Hence, an information exchange between the different network protocols can be realized, independent on which OSI layer they act, to optimize concurrent usage of resources and thereby avoid interference and efficiency loss. For example, a network protocol can exchange the information about current or planned capacity demand and/or current latency/capacity estimation or type of service or prioritization or planned/active scheduling by receiving information from the MCIE unit. Other network protocols which pick these information can adapt their behavior and return own information to the MCIE unit.

In an exemplary implementation form of the multipath device, the MPPM is configured to manage the multiple paths of the multipath network access interface based on information provided by the MCIE unit.

This provides the advantage that by exploiting available information from the MCIE unit, the MPPM is able to improve its policy management.

In an exemplary implementation form of the multipath device, the at least one multi-connectivity network protocol is configured to register and/or deregister at the MCIE unit for information exchange.

This provides the advantage that information exchange can be flexibly implemented. When a new network protocol is realized or started on the host processor, it can be easily registered at the MCIE unit which can provide the required information. When a network protocol is terminated, it can deregister from the MCIE unit which informs all other network protocols that are in connection with the terminating network protocol. Then the other network protocols can increase their resource quota. An additional advantage of the MCIE is that the MCIE unit may hook into a network protocol to take over processing tasks of the network protocol and/or to receive data from the network protocol, for example in cases in which the network protocol is not able to register or deregister an interface with the MCIE unit. The MCIE unit may at least partly take over control of the network protocol.

According to a second aspect, the invention relates to a method for processing multipath data traffic, the method comprising: receiving multipath data traffic via a multipath network access interface; processing, by at least one multi-connectivity network protocol, data traffic of the multipath data traffic that is related to the at least one multi-connectivity network protocol and received via multiple paths of the multipath network access interface, and managing, by a multipath protocol policy manager (MPPM), the multiple paths of the multipath network access interface according to a multipath network protocol policy.

By such a method, policies like path usage, bandwidth, etc. can be efficiently applied to multi-connectivity network protocols, in particular with respect to overall targets but also with the aid of protocol feedback. The MPPM can either directly communicate (uni-directional or bi-directional) with the network protocols or with the corresponding network paths available or both. The MPPM will apply efficient policies to the multi-connectivity network protocols. The MPPM can efficiently schedule resources, e.g. concurrent usage of network-protocol-specific resources, bandwidth, capacity, etc. The MPPM can be realized in hardware or in software, e.g. running on a host processor.

In an exemplary implementation form of the method, the network protocols include one or more of the following: ITU-T G998.2, SCTP, MPTCP, Link Aggregation, QUIC, ML-PPP, Huawei's GRE Tunnel Bonding Protocol.

This provides the advantage that a lot of currently used network protocols can be managed by such method for sharing information and resources in order to optimize their traffic distribution and path exploitation.

According to a third aspect, the invention relates to a computer readable non-transitory medium on which computer instructions are stored which, when executed by a computer, cause the computer to perform the method according to the second aspect of the invention.

According to a fourth aspect the invention relates to a computer program product comprising program code for performing the method according to the second aspect of the invention, when executed on a computer or a processor.

Embodiments of the invention can be implemented in hardware and/or software.

The following acronyms are applied in this disclosure:
CMT-SCTP Concurrent Multipath Transfer SCTP
GRE Generic Routing Encapsulation
MCIE Multipath Central Information Exchange
MPPM Multipath Protocol Policy Manager
MPTCP Multipath TCP
QoE Quality of Experience
OSI Open Systems Interconnection
QUIC Quick UDP Internet Connections
SCTP Stream Control Transmission Protocol
TCP Transmission Control Protocol
UDP User Datagram Protocol In the following detailed description, reference is made to the accompanying drawings, which form part of the disclosure, and in which are shown, by way of illustration, exemplary aspects in which the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

FIG. 1 shows a multi-homed capable endpoint 100 with several exemplary multi path enabled protocols. The multi-homed capable endpoint or endpoint device 100 is equipped with a multipath network access interface 120 and a host processor 110. The multipath network access interface 120 can have one access interface or a plurality of access interfaces which is/are configured to transmit multiple network paths 121, 122, 130. In FIG. 1 an integer number of n (for example n=1, 2, 3, 4, 5, 6, . . . ) network paths 121, 122, 130 is depicted. The network paths 121, 122, 130 can be distributed over the respective access interfaces of the multipath network access interface 120. For example a first and a second network path can be transmitted via a first access interface and a third network path can be transmitted via a second access interface of the multipath network access interface 120; or any other combination of network paths with access interfaces is possible. On the host processor 110 a multitude of multi-connectivity network protocols can be implemented, such as SCTP network protocol 112 according to "R. Stewart, "Stream Control Transmission Protocol", RFC No. 4960, September 2007", MPTCP network protocol 113 according to "A. Ford and C. Raiciu and M. Handley and O. Bonaventure, "TCP Extensions for Multipath Operation with Multiple Addresses", RFC no. 6824, January 2013", QUIC network protocol according to "Ryan Hamilton and Jana Iyengar and Ian Swett and Alyssa Wilk, "QUIC: A UDP-Based Secure and Reliable Transport for HTTP/2", draft-tsvwg-quic-protocol-02, January 2016", ITU-T G.998.2 network protocol 111, Link Aggregation network protocol 114, ML-PPP network protocol 116, Huawei's GRE Tunnel Bonding Protocol 117 and diverse others, e.g. CMT-SCTP network protocol according to "Paul Amer and Martin Becke and Thomas Dreibholz and Nasif Ekiz and Janardhan Iyengar and Preethi Natarajan and Randall Stewart and Michael Tuexen, "Load Sharing for the Stream Control Transmission Protocol (SCTP)", draft-tuexen-tsvwg-sctp-multipath-15, January 2018".

Figure 2:
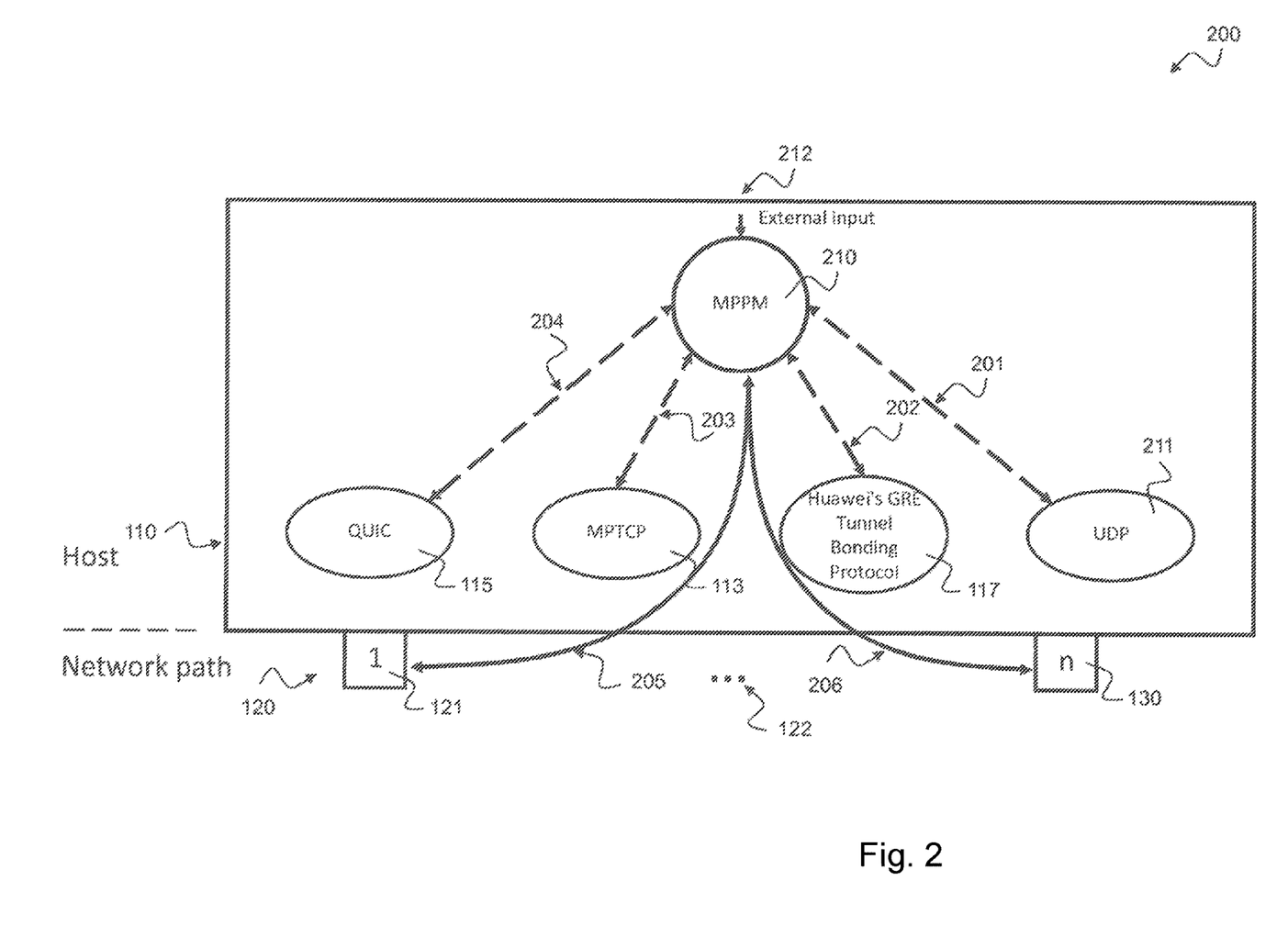
FIG. 2 shows a schematic diagram of a multipath device 200 according to the disclosure with a host equipped with multi-connectivity network protocols and a Multipath Protocol Policy Manager (MPPM)

FIG. 2 shows a schematic diagram of a multipath device 200 according to the disclosure with a host equipped with multi-connectivity network protocols and a Multipath Protocol Policy Manager (MPPM).

In FIG. 2, the unit MPPM 210 can act as single unit for managing multipath network protocol policies for the network protocols 115, 113, 117, 211. The MPPM 210 can apply the multipath network protocol policies to the network protocols 115, 113, 117, 211 by using interfaces 201, 202, 203, 204 between the MPPM 210 and the respective network protocols 115, 113, 117, 211. A respective policy can also be applied to the network paths 120 via interfaces 205, 206 between the MPPM 210 and the respective network paths 120.

If multi-connectivity network protocols exist it may be necessary to apply policies like capacity throttling for the network path or for a bunch of paths or for the access interfaces of the multipath network access interface 120. Another policy may be restriction to special types of network path and so on. Exemplary policies are dynamic, depending on the feedback of other protocols or delivered by external. At least one multi-connectivity network protocol should be implemented on the host. For example, network protocols QUIC 115, MPTCP 113, Huawei's GRE Tunnel Bonding Protocol 117 are multi-connectivity network protocols while network protocol UDP 211 can be seen as non-multi connectivity network protocol.

An exemplary functionality to implement such a feature is shown in FIG. 2, referred to as the "Multipath Protocol Policy Manager" (MPPM) 210. It is a unit which can either directly communicate (e.g. uni-directional or bi-directional) with the network protocols 115, 113, 117, 211 or with the corresponding network paths 121, 122, 130 or with the access interfaces of the multipath network access interface 120 available or any combination thereof. For example if a policy means to avoid a specific network path, e.g. 121, 122, 130, or a specific access interface of the multipath network access interface 120, this can be directly communicated to the network protocols 115, 113, 117, 211 so that they can adapt their inherent data-scheduling or path-management accordingly or on the other hand, the specific interface 120, where a path belongs to, is informed 205, 206 and can drop specific data. The policies or information for policy creation can be given via an external input.

Figure 3:
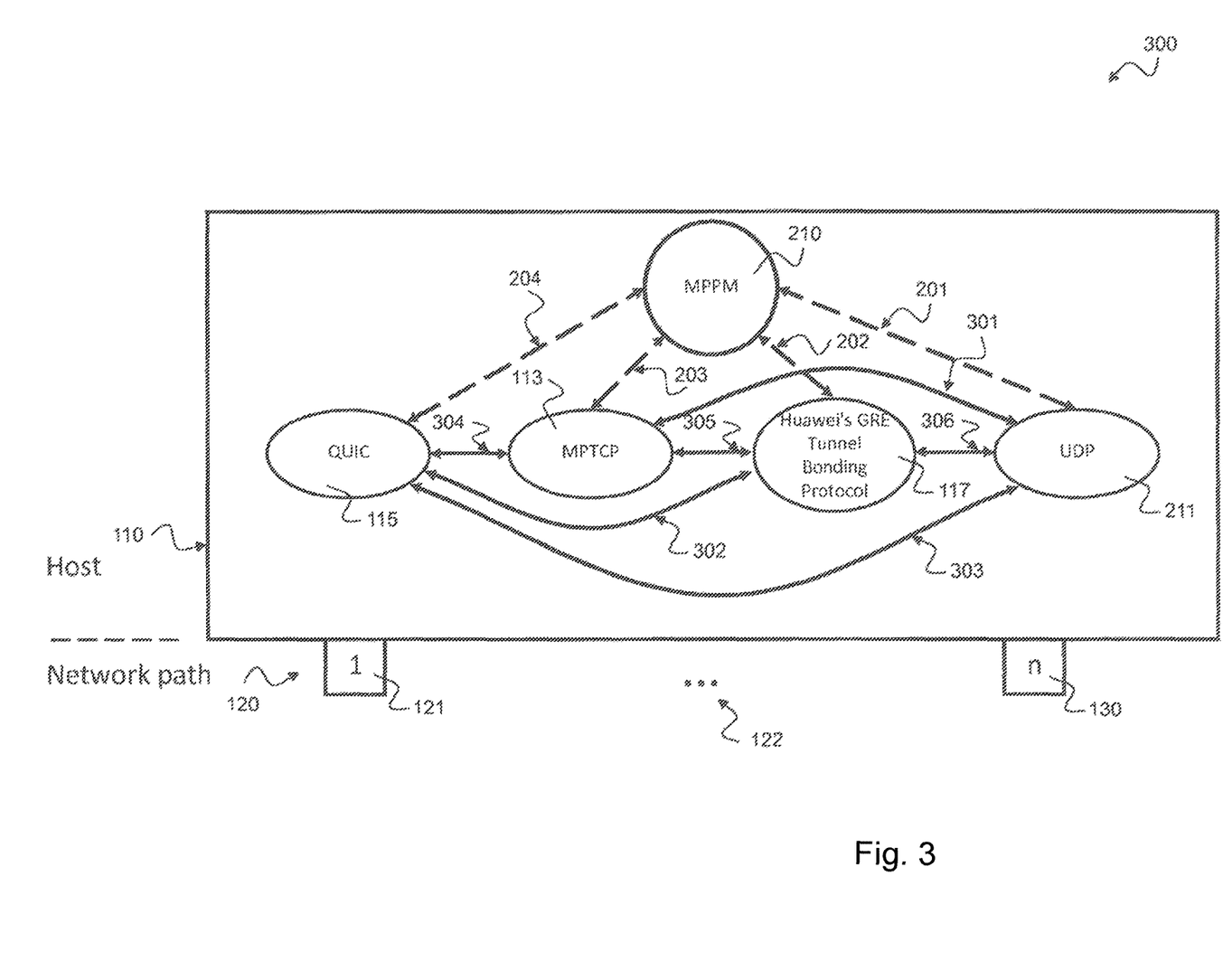
FIG. 3 shows a schematic diagram of a multipath device 300 according to the disclosure with a host equipped with multi-connectivity network protocols and MPPM in combination with network protocol information exchange.

FIG. 3 shows a schematic diagram of a multipath device 300 according to the disclosure with a host equipped with multi-connectivity network protocols and MPPM in combination with network protocol information exchange.

FIG. 3 shows a combination of the central exchange with the MPPM unit 210 as described above with respect to FIG. 2 and a direct exchange between the network protocols 115, 113, 117, 211, which may be relevant, if there is information which shall be shared amongst different protocols 115, 113, 117, 211 or exclusively transmitted between certain protocols 115, 113, 117, 211. A direct interface 306 is arranged between UDP protocol 211 and Huawei's GRE Tunnel Bonding Protocol 117. A direct interface 305 is arranged between Huawei's GRE Tunnel Bonding Protocol 117 and MPTCP protocol 113. A direct interface 304 is arranged between MPTCP protocol 113 and QUIC protocol 115. A direct interface 303 is arranged between UDP protocol 211 and QUIC protocol 115. A direct interface 302 is arranged between Huawei's GRE Tunnel Bonding Protocol 117 and QUIC protocol 115. A direct interface 301 is arranged between UDP protocol 211 and MPTCP protocol 115. Policy information may be exchanged by the MPPM 210 via the central interfaces 201, 202, 203, 204 and additionally via the decentral interfaces 301, 302, 303, 304, 305, 306.

To avoid interference and efficiency loss between different multi-connectivity network protocols 115, 113, 117 and even non-multi connectivity protocols 211, independent on which OSI layer they act, an information exchange can be combined together with the MPPM 210.

For example, a protocol can exchange the information about current or planned capacity demand and/or current latency/capacity estimation or type of service or prioritization or planned/active scheduling. The MPPM 210 can make use of those information to adapt policies dynamically.

Figure 4:
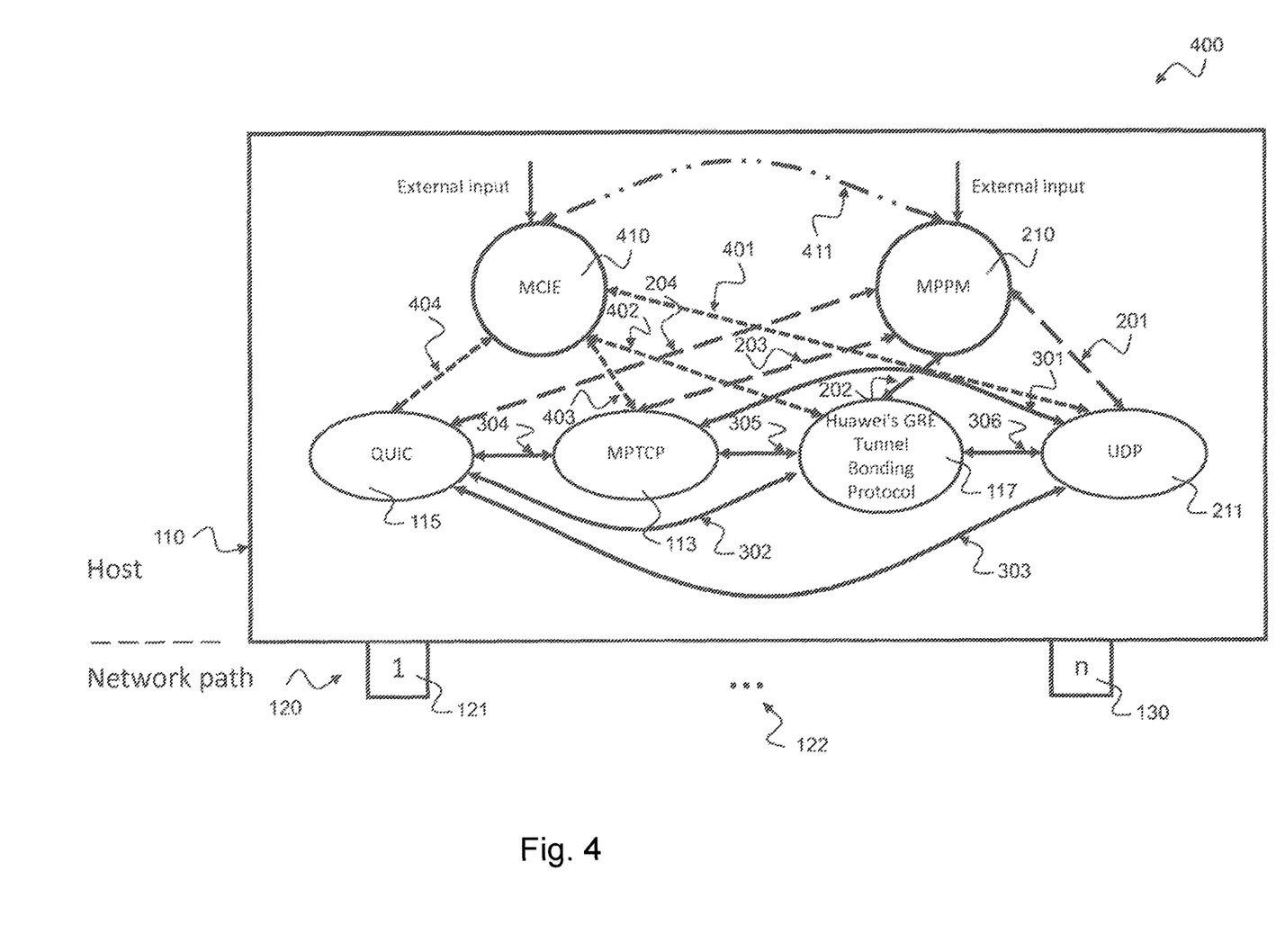
FIG. 4 shows a schematic diagram of a multipath device 400 according to the disclosure with a host equipped with multi-connectivity network protocols, MPPM and Multipath Central Information Exchange (MCIE) in combination with network protocol information exchange.

FIG. 4 shows a schematic diagram of a multipath device 400 according to the disclosure with a host 110 equipped with multi-connectivity network protocols, MPPM and Multipath Central Information Exchange (MCIE) in combination with network protocol information exchange. Additionally to the interfaces described above with respect to FIG. 3, the multipath device 400 shown in FIG. 4 includes the additional instance MCIE (Multipath Central Information Exchange) 410 which acts as a single unit for receiving and scheduling information 401, 402, 403, 404 between the protocols 115, 113, 117, 211. The protocols 115, 113, 117, 211 can register or deregister at MCIE 410 and they can provide their capabilities and interests to MCIE 410. The protocols 115, 113, 117, 211 can send, receive and request information 401, 402, 403, 404. Information 401, 402, 403, 404 can be limited to certain kinds of protocols 115, 113, 117, 211 or may be limited in time. Both, the MPPM 210 and the MCIE 410 are able to receive external information input as shown in FIG. 4.

In an exemplary implementation, the MCIE unit 410 can directly hook into a network protocol, e.g. one or more of the protocols 115, 113, 117, 211 shown in FIG. 4, to take over processing tasks of the network protocol 115, 113, 117, 211 and/or to receive data from the network protocol 115, 113, 117, 211, for example in cases in which the network protocol 115, 113, 117, 211 is not able to register or deregister an interface 401, 402, 403, 404 with the MCIE unit 410. The MCIE unit 410 can exchange information with the MPPM unit 210, e.g. as described below. The MPPM unit 210 may then at least partly take over control of the respective network protocol 115, 113, 117, 211 using the exchanged information.

A network protocol 115, 113, 117, 211 can exchange the information about current or planned capacity demand and/or current latency/capacity estimation or type of service or prioritization or planned/active scheduling via the various interfaces 201, 202, 203, 204, 301, 302, 303, 304, 305, 306, 401, 402, 403, 404 as shown in FIG. 4. The MPPM 210 can make use of this information to adapt policies dynamically.

The multipath device 200, 300, 400 as illustrated in FIGS. 2 to 4 can be used for processing multipath data traffic. Such multipath device 200, 300, 400 includes a multipath network access interface 120 for receiving multipath data traffic; and a host processor 110 configured to operate at least one multi-connectivity network protocol, e.g. network protocols 115, 113, 117 as shown in FIGS. 2 to 4, and a multipath protocol policy manager, MPPM 210. The at least one multi-connectivity network protocol 115 is configured to process data traffic of the multipath data traffic that is related to the at least one multi-connectivity network protocol 115 and received via multiple paths of the multipath network access interface 120. The MPPM 210 is configured to manage the multiple paths of the multipath network access interface 120 according to a multipath network protocol policy.

The MPPM 210 may be configured to manage path usage, bandwidth, load balancing, handover in case of path interruption and/or capacity aggregation for the multiple paths of the multipath network access interface 120.

The MPPM 210 may be configured to apply capacity throttling to specific paths of the multiple paths of the multipath network access interface 120 or to access interfaces of the multipath network access interface 120 itself according to the multipath network protocol policy.

The MPPM 210 may be configured to restrict reception of the data traffic to specific types of network paths according to the multipath network protocol policy.

The multipath network protocol policy may depend on feedback 202, 203 from other multi-connectivity network protocols, e.g. 117, 113 and/or feedback 201 from other non-multi connectivity network protocols, e.g. 211 running on the host processor 110 and/or on feedback delivered by external 212.

The MPPM 210 may be configured to inform the at least one multi-connectivity network protocol, e.g. 115 to select and/or avoid using specific network paths of the multipath network access interface 120 according to the multipath network protocol policy.

The MPPM 210 may be configured to inform the multipath network access interface 120 to drop data related to a specific network path according to the multipath network protocol policy.

The MPPM 210 may comprise an external interface 212 that may be configured to receive the multipath network protocol policy or information for policy creation of the multipath network protocol policy from an external device.

The at least one multi-connectivity network protocol, e.g. 115 may be configured to register and/or deregister at the MPPM 210 for receiving the multipath network protocol policy related to the at least one multi-connectivity network protocol 115.

The at least one multi-connectivity network protocol, e.g. 115 may be configured to provide its capabilities and interests to the MPPM 210 when registering at the MPPM 210.

The MPPM 210 may be configured to hook into the at least one multi-connectivity network protocol 115 to take over path management and/or data scheduling, in particular in cases in which the at least one multi-connectivity network protocol 115 is not able to register and/or deregister at the MPPM 210.

The host processor 110 may be configured to operate a plurality of network protocols which are multi-connectivity network protocols, e.g. 115, 113, 117 or non-multi connectivity network protocols, e.g. 211. The host processor 110 may further be configured to operate a Multipath Central Information Exchange (MCIE) unit 410 which is configured to exchange information, e.g. via interfaces 401, 402, 403,

404, between at least two network protocols of the plurality of network protocols 115, 113, 117, 211.

The MPPM 210 may be configured to manage the multiple paths of the multipath network access interface 120 based on information provided by the MCIE unit 410.

The at least one multi-connectivity network protocol, e.g. 115 may be configured to register and/or deregister at the MCIE unit 410 for information exchange 401, 402, 403, 404.

The multi-connectivity network protocol 115 may be configured to share network protocol-specific resources with other multi-connectivity network protocols and/or non-multi connectivity network protocols. The multi-connectivity network protocol 115 may be configured to share the network protocol-specific resources with other network protocols operating on different OSI (Open Systems Interconnection) layers than the multi-connectivity network protocol, e.g. on OSI layer 3 or OSI layer 4. The multi-connectivity network protocols may include one or more of the following: ITU-T G998.2, SCTP, MPTCP, Link Aggregation, QUIC, ML-PPP, Huawei's GRE Tunnel Bonding Protocol, e.g. as shown in FIG. 1.

The network protocols may exchange information that may include one or more of the following: current or planned capacity demand, current latency and/or capacity estimation, type of service, prioritization, planned and/or active scheduling.

The multi-connectivity network protocol, e.g. 115 may be configured to process the portion of the multipath data traffic that is related to the multi-connectivity network protocol 115, based on information received from the other network protocols, e.g. 113, 117, 211. The host processor 110 may be configured to process a common congestion control for two or more of the network protocols based on the exchanged information between the network protocols.

Congestion control modulates traffic entry into a telecommunications network in order to avoid congestive collapse resulting from oversubscription. This is typically accomplished by reducing the rate of packets and it should not be confused with flow control, which prevents the sender from overwhelming the receiver. Congestion control includes techniques such as exponential back-off, fair queueing, priority schemes, etc.

The host processor 110 may be configured to maintain a joint path management for at least two network protocols of the plurality of network protocols 115, 113, 117, 211 based on information exchanged between the at least two network protocols.

The host processor 110 may be configured to link a selected number of network protocols of the plurality of network protocols 115, 113, 117, 211 to each other in order to send, receive and/or request information from each other, in particular by two-way communication or by one-way communication.

The host processor 110 may be configured to form a full mesh information exchange 301, 302, 303, 304, 305, 306, e.g. as shown in FIGS. 3 and 4, or at least a partial mesh information exchange for linking the selected number of network protocols to each other.

The MCIE unit 410 may be configured to limit the information exchange 401, 402, 403, 404 to certain types of network protocols and/or limit the information exchange 401, 402, 403, 404 in time. For example information exchange may be limited to specific time slots. For example, some network protocols may be forbidden to exchange information, e.g. high-priority network protocols with low-priority network protocols, network protocols on different OSI layers, etc.

The MCIE unit 410 may be configured to control the information exchange 401, 402, 403, 404 based on external information input 212. For example the external information input may provide a configuration to the host processor. In this configuration specific limitation of information exchange, network protocols, interfaces and network paths may be specified.

In the example of FIG. 4, the host processor 110 may be configured to exchange a first portion of information, e.g. information 401, 402, 403, 404, between the network protocols via the MCIE unit 410 and a second portion of information, e.g. information 301, 302, 303, 304, 305, 306, directly between the at least two network protocols without using the MCIE unit 410, e.g. by bypassing the MCIE unit 410.

Figure 5:
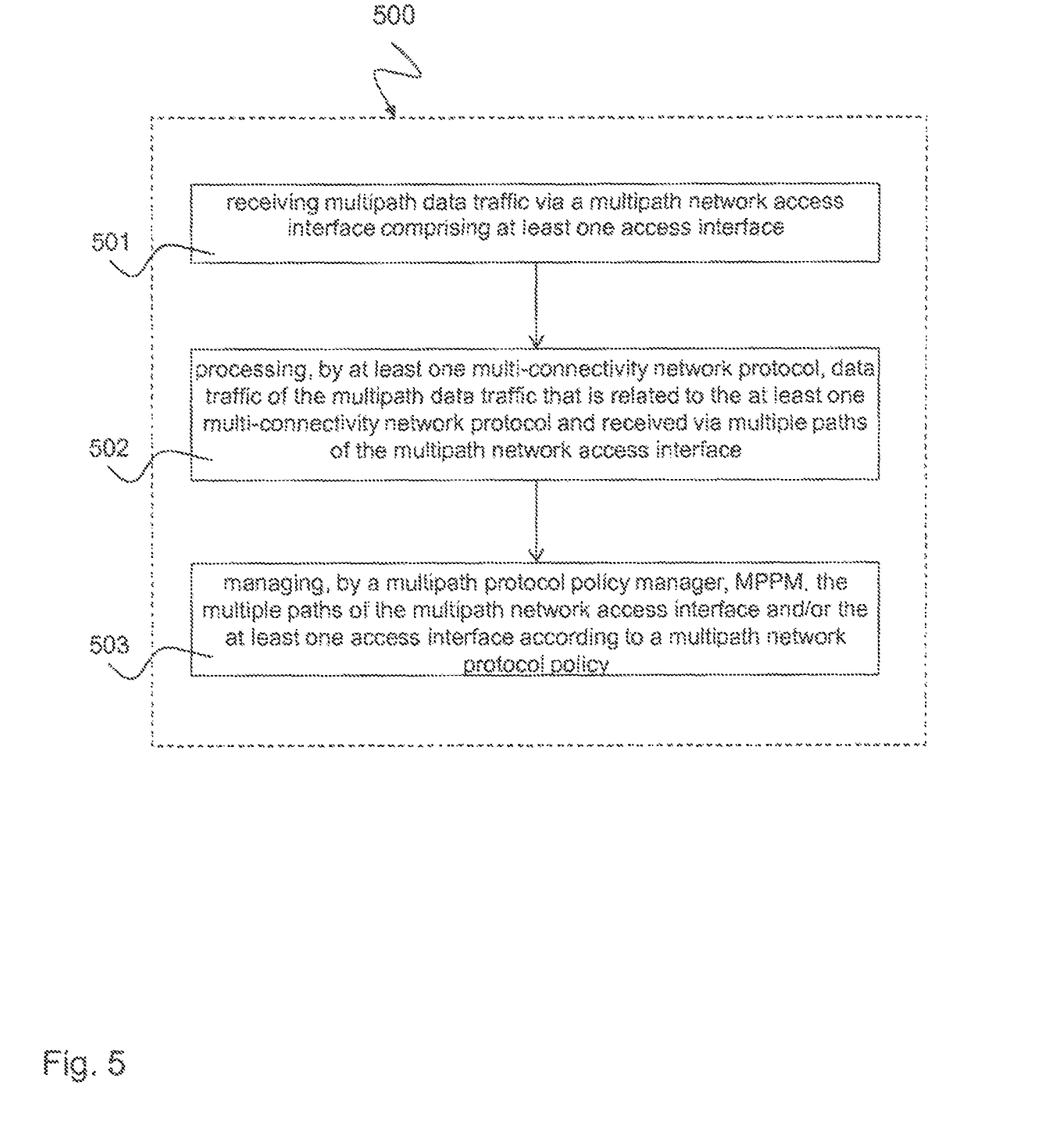
FIG. 5 shows a schematic diagram illustrating a method 500 for processing multipath data traffic according to the disclosure.

FIG. 5 shows a schematic diagram illustrating a method 500 for processing multipath data traffic according to the disclosure.

The method 500 comprises receiving 501 multipath data traffic via a multipath network access interface 120, e.g. as described above with respect to FIGS. 2 to 4.

The method 500 comprises processing 502, by at least one multi-connectivity network protocol 115, data traffic of the multipath data traffic that is related to the at least one multi-connectivity network protocol 115 and received via multiple paths of the multipath network access interface 120, e.g. as described above with respect to FIGS. 2 to 4.

The method 500 comprises managing 503, by a multipath protocol policy manager (MPPM) 210, the multiple paths of the multipath network access interface 120 according to a multipath network protocol policy, e.g. as described above with respect to FIGS. 2 to 4.

The method 500 may be implemented on a multipath device 200, 300, 400 as described above with respect to FIGS. 2 to 4, in particular on a host processor 110 as described above with respect to FIGS. 2 to 4.

The method 500 may include further steps, such as, for example, according to the computing blocks described above with reference to FIGS. 2 to 4, in particular as described above with respect to the multipath device 200, 300, 400 of FIGS. 2 to 4.

The method 500 may be implemented on a computer. Another aspect of the invention relates to a computer readable non-transitory medium on which computer instructions are stored which, when executed by a computer, cause the computer to perform the method 500.

Another aspect of the invention is related to a computer program product comprising program code for performing the method 500 or the functionalities described above, when executed on a computer or a processor. The method 500 may be implemented as program code that may be stored on a non-transitory computer medium. The computer program product may implement the techniques described above with respect to FIGS. 2 to 4.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A multipath device for processing multipath data traffic, the multipath device comprising:
a multipath network access interface comprising at least one access interface for receiving multipath data traffic; and
a host processor configured to operate at least one multi-connectivity network protocol and a multipath protocol policy manager (MPPM), wherein the at least one multi-connectivity network protocol includes a Quick User Datagram Protocol (UDP) Internet Connections (QUIC) network protocol;
wherein the at least one multi-connectivity network protocol is configured to process data traffic of the multipath data traffic that is related to the at least one multi-connectivity network protocol and received via multiple paths of the multipath network access interface;
wherein the MPPM is configured to:
manage a multipath network protocol policy for the QUIC network protocol; and
manage the multiple paths of the multipath network access interface and/or the at least one access interface of the multipath network access interface according to the multipath network protocol policy;
wherein the multipath network protocol policy depends on feedback from other multi-connectivity network protocols running on the host processor other than the at least one multi-connectivity network protocol;
wherein the QUIC network protocol is configured to register at the MPPM and to provide its capabilities and interests to the MPPM when registering at the MPPM; and
wherein the MPPM is configured to provide the multipath network protocol policy to the QUIC network protocol after the QUIC network protocol is registered at the MPPM.

2. The multipath device of claim 1, wherein the MPPM is configured to manage load balancing and/or handover in case of path interruption for the multiple paths of the multipath network access interface or the at least one access interface of the multipath network access interface.

3. The multipath device of claim 1, wherein the MPPM is configured to apply capacity throttling to specific paths of the multiple paths of the multipath network access interface or to access interfaces of the multipath network access interface according to the multipath network protocol policy.

4. The multipath device of claim 1, wherein the MPPM is configured to restrict reception of the data traffic to specific types of network paths or access interfaces according to the multipath network protocol policy.

5. The multipath device of claim 1, wherein the multipath network protocol policy further depends on feedback from other non-multi connectivity network protocols running on the host processor and/or on feedback delivered via an external input.

6. The multipath device of claim 1, wherein the MPPM is configured to inform the at least one multi-connectivity network protocol to select and/or avoid using specific network paths of the multipath network access interface and/or specific access interfaces of the multipath network access interface according to the multipath network protocol policy.

7. The multipath device of claim 1, wherein the MPPM is configured to inform the multipath network access interface to drop data related to a specific network path according to the multipath network protocol policy.

8. The multipath device of claim 1, wherein the MPPM comprises an external interface configured to receive the multipath network protocol policy or information for policy creation of the multipath network protocol policy from an external device.

9. The multipath device of claim 1, wherein the MPPM is configured to hook into the at least one multi-connectivity network protocol to take over path management and/or data scheduling in case that the at least one multi-connectivity network protocol is not able to register and/or deregister at the MPPM.

10. The multipath device of claim 1, wherein the host processor is configured to operate a plurality of network protocols, including a plurality of multi-connectivity network protocols and at least one non-multi connectivity network protocol; and wherein the host processor is configured to operate a Multipath Central Information Exchange (MCIE) unit which is configured to exchange information between at least two network protocols of the plurality of network protocols.

11. The multipath device of claim 10, wherein the MPPM is configured to manage the multiple paths of the multipath network access interface based on information provided by the MCIE unit.

12. The multipath device of claim 10, wherein the at least one multi-connectivity network protocol is configured to register and/or deregister at the MCIE unit for information exchange.

13. The multipath device according to claim 1, wherein a network protocol registered at the PPM is configured to deregister at the MPPM based on the registered network protocol being terminated; and wherein the MPPM is configured to inform other network protocols in connection with the terminated network protocol regarding termination of the terminated network protocol.

14. The multipath device according to claim 1, wherein the MPPM is further configured to hook into the QUIC network protocol to take over path management and/or data scheduling in case that the QUIC network protocol is not able to register and/or deregister at the MPPM.

15. The multipath device according to claim 1, wherein the at least one multi-connectivity network protocol further includes a Multipath Transmission Control Protocol (MPTCP) network protocol and a Generic Routing Encapsulation (GRE) Tunnel Bonding network protocol; and wherein the host processor is further configured to operate at least one non-multi-connectivity network protocol, wherein the at least one non-multi-connectivity network protocol includes a UDP protocol.

16. The multipath device according to claim 15, wherein the host processor is configured to maintain joint path management for the QUIC network protocol, the MPTCP network protocol, the GRE Tunnel Bonding network protocol, and the UDP protocol based on information exchanged between the QUIC network protocol, the MPTCP network protocol, the GRE Tunnel Bonding network protocol, and the UDP protocol.

17. A method for processing multipath data traffic, the method comprising:

receiving multipath data traffic via a multipath network access interface comprising at least one access interface;

processing, by at least one multi-connectivity network protocol running on a host processor, data traffic of the multipath data traffic that is related to the at least one multi-connectivity network protocol and received via multiple paths of the multipath network access interface, wherein the at least one multi-connectivity network protocol includes a Quick User Datagram Protocol (UDP) Internet Connections (QUIC) network protocol;

managing, by a multipath protocol policy manager (MPPM) running on the host processor, a multipath network protocol policy for the QUIC network protocol;

managing, by the MPPM, the multiple paths of the multipath network access interface and/or the at least one access interface of the multipath network access interface according to the multipath network protocol policy, wherein the multipath network protocol policy depends on feedback from other multi-connectivity network protocols running on the host processor other than the at least one multi-connectivity network protocol;

registering, by the QUIC network protocol, at the MPPM, wherein the QUIC network protocol provide its capabilities and interests to the MPPM when registering at the MPPM; and providing, by the MPPM, the multipath network protocol policy to the QUIC network protocol after the QUIC network protocol is registered at the MPPM.

18. The method according to claim 17, further comprising:

deregistering, by a network protocol registered at the MPPM, at the MPPM based on termination of the registered network protocol; and informing, by the MPPM, other network protocols in connection with the terminated network protocol regarding termination of the terminated network protocol.

* * * * *